United States Patent

Hansen et al.

[11] Patent Number: 5,650,478
[45] Date of Patent: Jul. 22, 1997

[54] LIQUID BINDING AGENTS

[75] Inventors: Achim Hansen; Michael König, both of Iserlohn; Stephan Schröter, Essen; Josef Suren, Haaren, all of Germany

[73] Assignee: Bakelite AG, Germany

[21] Appl. No.: 495,047

[22] Filed: Jun. 26, 1995

[30] Foreign Application Priority Data

Jul. 7, 1994 [GB] United Kingdom ............ 44 23 913.0

[51] Int. Cl.$^6$ .............................. C08G 8/04; C08G 14/04
[52] U.S. Cl. ..................... 528/129; 528/137; 528/142; 528/143; 528/145; 528/230; 528/488; 528/489; 523/145; 156/335
[58] Field of Search ................... 528/129, 137, 528/142, 143, 145, 230, 488, 489; 523/145; 156/335

[56] References Cited

U.S. PATENT DOCUMENTS 5,179,177  1/1993  Gerber .................................. 525/506

FOREIGN PATENT DOCUMENTS 3022534  1/1981  Germany.
93/03086  2/1993  Germany.

*Primary Examiner*—James J. Seidleck
*Assistant Examiner*—Dvc Truong
*Attorney, Agent, or Firm*—Bierman, Muserlian and Lucas LLP

[57] ABSTRACT

A liquid binding agent comprised of a phenolic resin, thinning agents and a curing agent, characterized in that the phenolic resin is produced by condensation catalyzed under alkaline conditions of a phenol and formaldehyde in a molar ratio of phenolic compound to formaldehyde in the range of 1:0.05 to 1.

9 Claims, No Drawings

LIQUID BINDING AGENTS

Liquid binding agents based on phenolic resins are primarily required as wetting and impregnating resins and specifically in the production of laminates, isolating/ insulating or grinding materials as well as also in the foundry and refractory industry. They are also used in the field of lacquers and varnishes, for coating and in acid proof installations. Previously, largely solutions of novolaks or resols and combinations thereof in organic solvents, partially in combination with water, in order to reduce or to avoid the use of organic solvents, or as aqueous solutions of resols are largely used. Aside from the fact that resols are not stable during storage, the water in these solutions must be evaporated after impregnation or wetting with the resol solutions. This is an undesirable process step. During the curing of resols, water is generated which is also undesirable.

Stable novolaks are known from EP-A 0,248,980, which are liquid at temperatures in the range of ambient temperature to 50° C. However, the fusion viscosities of these phenolic resins are still too high for many application purposes so that the impregnation or wetting process can be carried out at increased temperature. Therefore, according to DE-A 3,022,534, novolaks and curing agents are not dissolved in solvents but rather in reactive thinners, which also are network-forming during the curing. Examples of reactive thinners are furan-containing compounds which are added to the neutralized novolak resin. However, the solutions obtained show a high degree of pH-lability and they cannot be stored for any length of time.

In DE-A4,126,059 phenol and alkyl phenols serve as reactive thinners for novolaks and to attain a sufficient viscosity, the corresponding solutions must comprise approximately 50% of phenol. Due to this extremely high phenol content, problems are encountered regarding worker protection and emissions as well as a lowering of the strength values of the cured binding agents. Attempts to reduce the content of thinner using as the phenolic resin, the low-molecular liquid novolaks known from EP-A 0,248, 980, have failed since, after a short storage time, solid substances crystallize out of such solutions. This means solutions of novolaks with molar phenol-formaldehyde ratios of 1:0.1 to 0.5 phenol are not stable during storage.

OBJECTS OF THE INVENTION

It is an object of the invention to provide a liquid binding agent with high solid content based on phenolic resin, having a viscosity which permits good wetting and ready impregnation of substrates, even at ambient temperature and which is even capable of being stored for several months without crystallization or changes of viscosity, and whose content of free phenol is less than 25 percent by weight.

It is another object of the invention to provide a novel process for the preparation of said liquid binding agents.

These and other objects and advantages of the invention will become obvious from the following detailed description.

THE INVENTION

The novel liquid binding agents of the invention are comprised of a phenolic resin, thinning agents and a curing agent, characterized in that the phenolic resin is produced by condensation catalyzed under alkaline conditions of a phenol and formaldehyde in a molar ratio of phenolic compound to formaldehyde in the range of 1:0.05 to 1.

It has been found that stable low-viscosity solutions can be produced from a phenolic resin, reactive thinners and curing agents, if the phenolic resin is one which is produced through condensation, catalyzed under alkaline conditions, of a phenol and formaldehyde, where the molar ratio of the phenolic compound used to formaldehyde is in the range of 1:0.05 to 1, preferably in the range of 1:0.1 to 0.5 and more preferably of 1:0.2 to 0.4. The phenolic resin is condensed so that only 0.2 to 10%, particularly 2 to 5%, of the formaldehyde used is present in the form of methylol groups. 90 to 99.8%, in particular 95 to 98%, of the methylol groups formed in the reaction of the phenolic compound with formaldehyde are converted into methylene groups which link phenol nuclei with one another.

Examples of thinning agents are all conventional known solvents, such as alcohols, esters, glycols, ethers, carbonates, aromatic substances etc. as well as reactive thinners and water. It is also possible to use combinations thereof.

Examples of reactive thinners are phenol or alkylphenols with alkyl up to 10 carbon atoms, further furan-containing compounds, particularly furfuryl alcohol, but also low-viscosity glycidyl compounds knows as reactive thinners from epoxy resin chemistry. Their amount is in the range of 1 to 25 percent by weight of the total binding agent, preferably about 5 to 10 percent by weight. The preferred reactive thinner is phenol.

Curing agents are compounds forming formaldehyde in the presence of heat, such as trioxane, paraformaldehyde or particularly hexamethylenetetramine, but also resols, melamine or urea, epoxy resins or isocyanates. They are conventionally used in amounts of 1 to 15% by weight relative to the total binding agent. If, as the reactive thinner, diglycidyl compounds are used, these serve simultaneously also as curing agent and a latent curing catalyst known per se is added to the mixture for example an imidazole derivative, a ketimine or a complex compound of the formula $Me^{x+}$ (chelate)y(anion) (x-y), in amounts known per se.

Depending on the field of application, the binding agents of the invention are either used directly as impregnating resins (laminate production) or as a wetting resin (mineral fiber insulating substances, textile fleece, derived timber products) or mixed in known manner with any desired filler and/or additives, potentially also in combination with further extenders or binding agents such as novolak powder resins, unvulcanized rubbers, thermoplasts, epoxy resins or polyesters, and these mixtures are cured after shaping at ambient temperature (catalytically) or increased temperature (80° to 160° C.).

The binding agents of the invention are also suitable for use as resins for lacquers and varnishes and adhesive agents and for acid-proof installations.

The production of the binding agents of the invention takes place in such a way that the special phenolic resins are mixed with reactive thinners and curing agents. For this purpose, the phenolic resins are produced by condensation, known per se, of phenolic compounds with formaldehyde or a substance forming formaldehyde under the reaction conditions, i.e. through the thermal treatment of an formaldehyde (cf. Knop, Pilato; Phenolic Resins, Springer-Verlag 1985, pp. 95), where the special molar ratio, nontypical for resols, of phenolic compound to formaldehyde of 1:0.05 to 1, particularly of 1:0.1 to 0.5 and preferably of 1:0.2 to 0.4, is provided for the reaction.

In a first reaction stage, methylol phenols are formed which, with further thermal treatment, condense with one another and with the free phenolic compound with the formation of dimethyl ether or methylene bridges. The thermal treatment is carried out until more than 90% of the formaldehyde used, particularly 90 to 99.8%, more preferably 95 to 98%, of the formaldehyde is present as methylene and/or dimethylether bridges. Then water, and not the converted phenolic compound, is distilled off and the phenolic resin is mixed with a reactive thinner and a curing agent.

If the reactive thinner is identical with the phenolic compound used in the condensation reaction, the last step can be simplified in so far as the phenolic compound is distilled from the resin only to the desired residual phenol content. As phenolic compound are mononuclear or polynuclear phenols or mixtures of the listed classes of compounds. Examples of this are phenol itself, as well as its alkyl-substituted homologues such as o-, m- or p-cresol or higher alkylated phenols with alkyl chains up to 10 carbon atoms. In addition, halogen-substituted phenols such as chloro- or bromophenol, bisphenol A and multivalent phenols such as resorcinol and catechol can be used.

In the following examples, there are described several preferred embodiments to illustrate the invention. However, it should be understood that the invention is not intended to be limited to the specific embodiments.

EXAMPLE 1

94 kg of phenol were mixed with 1.8 kg of N,N-dimethyl benzylamine and the mixture was heated to approximately 100° C. While stirring and refluxing, 13.3 kg of 45% formalin were added over a period of 3 hours (phenol-formaldehyde ratio 1:0.2). After the addition was completed, the reaction mixture was refluxed until a free formalin content of <0.5% was reached and then, phenol and water were distilled off. By adding "solvents", the viscosity was then adjusted to approximately 2,000 Mpa.s at 20° C.

Solvents a) ethylene glycol (1,2-dihydroxy ethane)
b) furfuryl alcohol
c) ethylene glycol and water
d) furfuryl alcohol and water
e) phenol

EXAMPLE 2

Example 1 was repeated except that after the condensation reaction, distillation to a phenol content of 5 to 10 percent took place. By adding solvents, the viscosity was then adjusted to approximately 2,000 Mpa.s at 20° C.

Solvents a) ethylene glycol
b) furfuryl alcohol
c) ethylene glycol and water
d) furfuryl alcohol and water
e) water

EXAMPLE 3

Example 1 was repeated with a molar ratio of phenol:formaldehyde of 1:0.25 (94 kg phenol:16.7 kg formalin (45%)).

EXAMPLE 4

Example 2 was repeated with a molar of phenol:formaldehyde of 1:0.3 (94 kg phenol:20 kg formalin 45%)).

EXAMPLE 5

Example 2 was repeated with a molar ratio of phenol:formaldehyde of 1:0.35 (94 kg phenol:23.3 kg formalin 45%)).

Comparison Example 94 kg of phenol were mixed with 940 g of oxalic acid and the mixture was heated to approximately 100° C. While stirring and under reflux, 13.3 kg of 45% formalin were added over a period of 3 hours. After the addition was completed, the reaction mixture was refluxed until a free formalin content of <0.5% was attained. Then, phenol and water were distilled off until a content of free phenol of <0.5% was attained. By adding "solvents", the viscosity was then adjusted to approximately 2,000 Mpa.s at 20° C.

Solvents a) ethylene glycol
b) furfuryl alcohol
c) ethylene glycol and water
d) furfuryl alcohol and water
e) phenol

RESULTS

The solutions produced in this way were each stored for 4 weeks at different temperatures and then tested for stability. The results are listed in the following Table:

| Storage | | 5° C./4 Weeks | 25° C./4 Weeks | 45° C./4 Weeks |
|---|---|---|---|---|
| Examples 1, 2, 3, 4, 5 each | a | solution clear | solution clear | solution clear |
| | b | solution clear | solution clear | solution clear |
| | c | solution clear | solution clear | solution clear |
| | d | solution clear | solution clear | solution clear |
| | e | solution clear | solution clear | solution clear |
| Comparison Example | a | product precipitated | product precipitated | product precipitated |
| | b | product precipitated | product precipitated | product precipitated |
| | c | product precipitated | product precipitated | product precipitated |
| | d | product precipitated | product precipitated | product precipitated |
| | e | product precipitated | product precipitated | product precipitated |

Various modifications of the products and process of the invention may be made without departing from the spirit or scope thereof and it is to be understood that the invention is intended to be limited only as defined in the appended claims.

What we claim:

1. A liquid binding agent comprised of a phenolic resin, thinning agents and a curing agent, characterized in that the phenolic resin is produced by condensation catalyzed under alkaline conditions of a phenol and formaldehyde in a molar ratio of phenolic compound to formaldehyde in the range of 1:0.05 to 1, the phenolic resin is condensed so that only 0.2 to 10% of the formaldehyde used is present in the form of methylol groups.

2. A binding agent of claim 1 wherein the molar ratio of phenolic compound to formaldehyde is in the range of 1:0.1 to 0.5.

3. A binding agent of claim 1 wherein the molar ratio of phenolic compound to formaldehyde is the range of 1:0.2 to 0.4.

4. A binding agent of claim 1 wherein the phenolic resin is condensed so that only 2 to 5% of the formaldehyde used is present in the form of methylol groups.

5. A process for the production of a binding agent of claim 1 comprising condensing a phenolic compound and formaldehyde in a molar ratio of 1:0.05 to 1 under alkaline conditions until more than 90% of the formaldehyde is present as methylene and/or dimethyl bridges, the phenolic resin is condensed so that only 0.2 to 10% of the formaldehyde used is present in the form of methylol groups, then distilling off water and not the converted phenolic compound, and then mixing the phenolic resin with a reactive thinner and a curing agent.

6. The process of claim 5 wherein the phenolic compound and formaldehyde are in a molar ratio of 1:0.1 to 0.5.

7. The process of claim 5 wherein the phenolic compound and formaldehyde are in a molar ratio of 1:0.2 to 0.4.

8. The process of claim 5 wherein the condensation is carried out until 90 to 99.8% of the formaldehyde used is present as methylene bridges.

9. The process of claim 5 wherein the condensation is carried out until 95 to 98% of the formaldehyde is present as methylene and/or dimethyl ether bridges.

* * * * *